Patented Oct. 11, 1927.

1,644,842

UNITED STATES PATENT OFFICE.

MARGARET B. MacDONALD, OF KNOXVILLE, TENNESSEE, ASSIGNOR TO UNIVERSITY OF TENNESSEE, OF KNOXVILLE, TENNESSEE, A CORPORATION OF TENNESSEE.

PROCESS FOR THE REMOVAL OF UNDESIRABLE FOREIGN FLAVORS AND ODORS FROM MILK, CREAM, AND OTHER MILK PRODUCTS.

No Drawing.   Application filed December 23, 1926.   Serial No. 156,768.

This invention relates to methods or processes for the removal of undesirable foreign flavors and odors from milk, cream and other milk products.

Milk and cream produced in certain districts and at certain seasons of the year have a decidedly foreign and disagreeable flavor and odor received from aromatic plants and weeds upon which the cows producing the milk have fed, of which plants and weeds the wild onion may be taken as typical. Such milk and cream and the milk products made therefrom are decidedly below standard grade due to the persistence of the foreign obnoxious odors and flavors referred to.

A general object of this invention is to provide an easily performed method or process for the elimination from the milk, cream and other milk product of the foreign matter giving rise to the aforesaid objectionable odors and flavors.

The prior art includes many different processes and apparatus directed to the purification of milk and milk products from objectionable foreign flavors and odors, but my present invention is directed to a process for such purification which, so far as I am aware, is fundamentally different and avoids certain objectionable features, difficulties and disadvantages attending the prior art processes.

Attempts have been made, for example, to attain the object in view by chemical treatment of the milk or cream in order either to oxidize the organic compounds giving rise to the obnoxious odors and flavors or to convert them into inoffensive compounds or insoluble compounds which could be removed from the body of the milk or cream. These methods have not been successful, however, due to the fact that the organic compounds referred to have been found to be no more readily oxidizable than some of the normal constituents of the milk and cream and to the fact that these organic compounds are not readily, if at all, convertible into inoffensive or insoluble compounds.

Other attempts have been made to solve the problem by driving off the objectionable flavors and odors from the milk or cream by the application of heat alone or sometimes associated with a reduction in pressure on the body of the liquid treated. Such methods have generally been found objectionable because of the tendency of the casein in the milk to harden or to otherwise undergo alteration from its normal condition under the application of the relatively high degree of heat required. To avoid the direct application of so high a degree of heat to the liquid undergoing the treatment, other methods have introduced forced streams of preheated air into the body of the liquid so as to remove the objectionable matters by the combined vaporizing action of the heat and the agitating and carrying effect of the air streams. In addition to requiring elaborate and expensive apparatus, the last referred to methods present the possibility of oxidation of some of the normal constituents of the milk or cream, and generally also involve other changes in the normal content of the milk, and especially the driving off of a large part of its water content.

Among the particular objects of the present invention are to provide a method or process for the removal of the undesirable flavors and odors from milk and milk products, which is simple in character, involving relatively little manipulation of the milk or milk product, and readily carried out by simple apparatus available in the ordinary household, especially the farm household, and yet which is adaptable to the larger scale commercial operations required in the preparation for market of the milk or milk product at the usual dairy depot or creamery.

Other particular objects of the invention are to provide such a method or process requiring the use of no chemicals or other agents having a reactive effect on any of the normal constituents of the milk or milk product, and resulting in no substantial loss of or change in constitution or flavor of any of these normal constituents, and which can be successfully performed by simple apparatus at ordinary room temperature or if desired at a somewhat higher temperature but not requiring a substantially higher degree of heat.

It has been found that the typical onion or garlic flavor and odor in milk is due to malodorous sulphides, and that they are carried almost entirely by the milk fat, very little of the disagreeable flavor and odor being left when the cream is removed from such milk. My invention, broadly considered, contemplates the removal of these malodorous sulphides by utilizing an oleaginous agent which is inert so far as any reactive effect on the natural constituents of the milk is concerned, but which is capable of taking up from the milk fat the malodorous unsaturated sulphides carried thereby; and which is capable therefore of acting as a vehicle for their removal. More specifically the oleaginous agent used may be one which is a better solvent for the malodorous sulphides than is the milk fat. While my invention contemplates the use of an agent of this character which can be and is intended to be readily and approximately completely removed with the sulphides it carries, from the milk or milk product treated, preferably the agent used should be such as to constitute a safe addition to a food product and not an adulterant; preferably also it should be tasteless and odorless. My invention also contemplates the use of such an agent which, after its recovery from the liquid treated, can be purified of the sulphides it carries, so that, without substantial loss, it can be used again in the process.

I preferably employ a mineral hydrocarbon oil as the agent for removing the unsaturated sulphides referred to; and among various such oils meeting the requirements of the oleaginous agent referred to above, and suitable for use in the practice of my invention, refined mineral or paraffin oils, non-volatile at ordinary temperatures, such for example as up to appoximately 160° F., and particularly those that are practically free from color, taste and odor, and of a specific gravity different from butter fat for convenience in separation, are usually best adapted for the purposes here in view. Of such oils, those known commercially as "white oils", some of which are used for medicinal purposes, possess characteristics which render them especially advantageous for use in my present process. It is to be understood, however, that the broad invention is not limited to the employment of such oils, these being referred to here only by way of an illustrative example representing a particularly desirable type of oily vehicle adapted for the purpose in view.

Again referring to the general principles of the invention, an essential use of the oil is that it be dispersed throughout the milk or other milk product with minimum inclusion of air. As a working hypothesis, it may be assumed that the organic sulphides are condensed on the surface of the fat globules in the liquid and that the mineral oil as it comes in contact with the fat globules dissolves or takes up the sulphides.

The foregoing objects and principles of the invention and other objects and principles thereof will more fully appear from the two specific illustrative examples of the practice of the process hereinafter given, these examples being instances of practice of the process, using apparatus of a very simple and common type.

In the case of treatment of whole milk, a measured quantity thereof is used. In the case of the treatment of cream or other milk product, it is diluted with milk or water, preferably the former, and a measured quantity used.

The measured quantity of the liquid to be treated is poured into a separatory funnel, or other like suitable vessel, and one tenth as much mineral oil, preferably, altho not necessarily, of the refined "white oil" type referred to above, is added. The mixture is sharply shaken once or twice to break the oil into globules and then gently shaken to distribute it well throughout the milk. The container is then allowed to stand for a time sufficient to allow the oil to rise to the surface. This generally takes from three to five minutes. The foregoing steps are then repeated and the milk drawn off. In most instances, this treatment proves sufficient to remove the typical onion or garlic odor from the milk or other milk product treated, although in some samples treated there will sometimes be left a flavor fairly perceptible as an aftertaste. In such instances, the milk or milk product subjected to the treatment referred to is drawn off into a second separatory funnel or the like container, a fresh portion of the oil is added and the process repeated. The second treatment completely removes any residual onion or garlic flavor from the milk unless the sample was an exceptionally bad one, in which case a third treatment may be necessary.

The oil from the first treatment acquires a slightly yellow tinge and a strong onion or garlic odor characteristic of the unsaturated sulphides carried thereby and removed from the milk or milk product. The purification of this oil for subsequent use in the process may be done by any of the well known methods of purifying oils. A simple method, effective in removing the matters giving rise to the foreign color and odor, is to first wash the oil with water, then with a ten per cent solution of sodium carbonate and again with water. This may be done in the separatory funnels or other containers used in the process and in which the oil used in the treatment may be left for the purification step, after the treated milk or milk product has been withdrawn therefrom. The washed oil may be further purified by passing air or steam therethrough. Where the equipment permits, the passing of steam through the oil as a final purification step is recommended.

More than ninety-five per cent of the oil used has been found to be recoverable and the recovered and purified oil is found to be approximately colorless, odorless and ready for use again in the milk-treating process.

In another example of practice of the process, an ordinary milk bottle or other container that can be closed by a stopper or tight fitting lid is substituted for the separatory funnel. The relative amounts of milk or milk product and oil and the dispersion of the oil throughout the body of the liquid treated is the same as in the preceding example. After the second shaking of the container, the mixture is, however, in this instance, immediately poured onto a filter or strainer of wet cotton fiber or cloth through which the milk or the liquid milk or milk product readily passes but through which the oil does not pass. This simple method of filtration gives a substantially complete separation of the mineral oil from the liquid treated. A second and a third treatment is given where found necessary, as already stated. A fresh filter is used for the second and third treatment which, of course, are repetitions of the first treatment. This simple method, with the simple apparatus used, is especially well adapted to farm and household use.

The filters may be prepared by putting a layer of absorbent cotton of suitable thickness, or several layers of cotton cloth, in a Buchner funnel or in an ordinary milk strainer and wetting the cotton fiber thoroughly with water or milk. The perforated bottom of the Buchner funnel and the wire gauze of the ordinary milk strainer are not a necessary part of the filter. Equally good results may be obtained with a filter made by clamping several layers or thicknesses of cotton cloth over the bottom of a strainer without a wire gauze.

After the filtration step, the oil left on the filter is washed as in the first example. It is then freed from the washings by filtration on a wet cotton filter and may then be further purified with air or steam. The amount of oil recovered and its purification is substantially as in the first example.

The process may be performed on any kind of milk or milk product which can be conveniently treated, and the treatment may be of raw milk or cream or of Pasteurized milk or cream.

It has been found, by analysis of samples of the same milk treated by the process, and untreated, that there is no appreciable loss of or change in the natural constituents of the milk, there being no loss or change whatever in the milk protein, carbohydrates and mineral content, and so small a loss in milk fat as to be discernible only by a very slightly lower saponification value for the fat from the treated milk, as determined from a comparison of the saponification values for the ether extract from the treated and untreated samples of the milk and from the fresh and used oil. It has also been found that cream from samples of the treated and untreated milk churn equally well and give butter of equally good quality, indicating that there is no appreciable loss by the treatment of milk fat or residual oil left in the cream injuriously affecting the quality of the butter produced.

The amount of oil required to remove the objectionable odor and flavor has been found to depend to some extent upon the fat content of the liquid treated and on the objectionable constituents giving rise to the obnoxious odors and flavors, and, to a very limited extent, upon the temperature at which the treatment is carried out.

Satisfactory results are generally obtained in the treatment at room temperature although a somewhat higher temperature may advantageously be used in some cases. Although, as stated, in no event is the loss of milk fat sufficiently appreciable to injuriously affect the quality of the butter produced, and is discernible only as a slightly lowered saponification value upon exact determination, a slightly increased temperature of the treatment, up to approximately 40° C. (104° F.) has been found advantageous in reducing even this small loss of fat.

Excellent results have been obtained by the treatment at room temperature of 100 parts of fresh raw milk of 1.8 to 5.0 per cent fat with 10 parts of the oil for each treatment. For milk having a greater content of fat or of the objectionable constituents giving rise to the obnoxious odors and flavors, a proportionally greater amount of oil may advantageously be used, and, as already stated, the temperature at which the treatment is carried out may in some cases advantageously be slightly increased.

Shaking a mixture of the oil and milk or diluted cream, as given in the illustrative examples of the process, has proved to be the most efficient method of effecting the required intimate mixing or dispersion of the oil throughout the liquid treated for easily handled quantities of milk, and the specific examples are here presented as more particularly adapted to ordinary farm and household use. It is to be understood, however, that these examples are not restrictive but are merely illustrative of the general principles of the process, and that those principles and the scope of the invention cover the adaptation of the process to its practice on a larger commercial scale, wherein may be used apparatus more adapted to the handling of larger quantities of the milk or milk products and other means than the simple shaking of the liquid and added oil for the dispersion of the oil throughout the liquid.

What is claimed is:

1. The process of treating milk and milk products to remove foreign malodorous organic matter therefrom comprising washing out from said milk or milk product said organic matter by dispersing through said milk or milk product an oleaginous liquid capable of taking up said organic matter and removing said oleaginous liquid with the organic matter carried thereby.

2. The process of removing malodorous organic matter from milk and milk product comprising washing out from said milk or milk product said organic matter by a liquid constituting a solvent for said organic matter and substantially inert in respect to any solvent or reactive effect on the normal constituents of said milk or milk product.

3. The process of treating milk and milk products to remove foreign malodorous organic matter therefrom comprising mixing with a liquid body of said milk or milk product an oleaginous solvent for said organic matter and subsequently separating said oleaginous solvent and said liquid body.

4. The process of treating milk and milk products to remove foreign malodorous organic matter therefrom comprising mixing with a liquid body of said milk or milk product an oleaginous substance which is inert in effect on the milk or milk product constituents but is a solvent for said malodorous organic matter and subsequently separating said milk or milk product and said oleaginous substance with the organic matter carried thereby.

5. The process of treating milk and milk products to remove malodorous unsaturated organic sulphides therefrom comprising mixing with said milk or milk product an oleaginous solvent for said sulphides and subsequently removing said oleaginous solvent from said mixture.

6. The process of treating milk and milk products to remove malodorous organic sulphides therefrom comprising mixing with a liquid body of said milk or milk product an oleaginous solvent for said organic sulphides and subsequently removing said oleaginous solvent from said milk or milk product.

7. The process of treating milk and milk products to remove foreign odors and flavors comprising the mixing of mineral oil with a liquid body of said milk or milk product and then removing the mineral oil from said liquid treated.

8. The process of treating milk and milk products to remove malodorous unsaturated organic sulphides therefrom comprising mixing a mineral oil with said milk or milk product and subsequently removing the mineral oil from said mixture.

9. The process of treating milk and milk products to remove malodorous unsaturated organic sulphides therefrom comprising mixing a mineral oil solvent for said sulphides with said milk or milk product and subsequently removing said solvent from said mixture.

10. The process of treating milk and milk products to remove foreign odors and flavors comprising mixing with said milk or milk product a substantially colorless, tasteless and odorless mineral oil and then removing the mineral oil from the mixture.

11. The process of treating milk and milk porducts to remove malodorous unsaturated organic sulphides therefrom comprising mixing with said milk or milk products an inert mineral oil, non-volatile at ordinary temperatures, substantially colorless, odorless, tasteless, and constituting a solvent for said sulphides, and subsequently removing said oil from said mixture.

12. The process of treating milk and milk products to remove foreign odors and flavors comprising maintaining said milk or milk product treated at room temperature or at a temperature not higher approximately than forty degrees centigrade, mixing with said milk or milk product a substantially colorless, tasteless, odorless and inert mineral oil, non-volatile at the temperature of said treatment, and then removing the mineral oil from the mixture.

13. The process for removing onion or garlic flavor and odor from milk and milk products comprising the mixing of mineral oil with said milk or milk product and subsequently removing said mineral oil from said mixture.

14. The process for removing malodorous unsaturated organic sulphides from milk and milk products comprising adding to a measured quantity of a liquid body of said milk or milk product approximately ten per cent by volume of a mineral oil solvent for said sulphides, dispersing said oil through said liquid, then causing the oil to rise to the surface of said liquid from its dispersed condition, and thereafter removing said treated liquid from the supernatant oil.

In testimony whereof I hereunto affix my signature.

MARGARET B. MacDONALD.